United States Patent
Sodagar (10) Patent No.: US 11,489,898 B1
(45) Date of Patent: Nov. 1, 2022

(54) METHOD AND APPARATUS FOR SEGMENT-BASED SPLIT AND MERGE FUNCTIONS FOR PARALLEL PROCESSING OF MEDIA

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/702,096

(22) Filed: Mar. 23, 2022

Related U.S. Application Data (60) Provisional application No. 63/219,234, filed on Jul. 7, 2021.

(51) Int. Cl.
| | |
|---|---|
| *H04L 65/60* | (2022.01) |
| *H04L 69/06* | (2022.01) |
| *H04L 29/06* | (2006.01) |
| *H04L 65/70* | (2022.01) |
| *H04L 47/34* | (2022.01) |
| *H04L 45/74* | (2022.01) |
| *G06F 9/50* | (2006.01) |
| *G06F 9/38* | (2018.01) |

(52) U.S. Cl.
CPC .............. *H04L 65/70* (2022.05); *H04L 45/74* (2013.01); *H04L 47/34* (2013.01)

(58) Field of Classification Search
USPC ......................................................... 709/217
See application file for complete search history.

(56) References Cited

U.S. PATENT DOCUMENTS

| | | | |
|---|---|---|---|
| 2013/0091251 A1 | 4/2013 | Walker et al. | |
| 2018/0070114 A1 | 3/2018 | Phillips et al. | |
| 2019/0037252 A1* | 1/2019 | Wagenaar | H04N 21/23106 |
| 2020/0111510 A1* | 4/2020 | Wang | H04N 21/816 |
| 2020/0219536 A1* | 7/2020 | Wang | G11B 27/034 |
| 2020/0304508 A1* | 9/2020 | Bae | H04L 63/0876 |

(Continued)

OTHER PUBLICATIONS

ISO/IEC JTC 1/SC 29/WG 11; N19062; Coding of Moving pictures and audio Convenorship: UNI (Italy); "Text of ISO/IEC FDIS 23090-8 Network-based media processing", Jan. 2020, pp. 1-105.

(Continued)

*Primary Examiner* — Jude Jean Gilles
(74) *Attorney, Agent, or Firm* — Sughrue Mion, PLLC (57) ABSTRACT

A method and apparatus for processing a media stream including segments with common headers via a network based media processing (NBMP) function, performed by at least one processor. The method includes obtaining an input stream including one or more segments, identifying a start code in the segments, wherein the start code is present at a beginning of a segment and the start code is a unique code that indicates a start of the segment, identifying a sequence number in the segments, wherein the sequence number indicates a location of a segment in the segments, splitting the input stream into sub-streams and signaling a location of a respective common header in each of the sub-streams, based on the start code and the sequence number, and merging the sub-streams and signaling a location of a common header, based on the start code and the sequence number, and generate an output stream.

20 Claims, 7 Drawing Sheets

(56) References Cited

U.S. PATENT DOCUMENTS

| | | | |
|---|---|---|---|
| 2020/0322650 A1 | 10/2020 | Oh et al. | |
| 2021/0004273 A1* | 1/2021 | You | G06F 9/5027 |
| 2021/0096903 A1* | 4/2021 | Sodagar | G06F 9/485 |
| 2021/0096924 A1* | 4/2021 | Sodagar | G06F 9/3802 |
| 2021/0099403 A1* | 4/2021 | Sodagar | H04L 49/90 |

OTHER PUBLICATIONS

ISO/IEC JTC 1/SC29/WG 03; N0202; "Potential improvement on ISO/IEC 23090-8 AMD 1 NBMP Function Templates"; Apr. 2021, pp. 1-87.
International Search Report dated Aug. 12, 2022 in International Application No. PCT/US2022/024348.
Written Opinion of the International Searching Authority dated Aug. 12, 2022 in International Application No. PCT/US2022/024348.

* cited by examiner

METHOD AND APPARATUS FOR SEGMENT-BASED SPLIT AND MERGE FUNCTIONS FOR PARALLEL PROCESSING OF MEDIA

CROSS-REFERENCE TO RELATED APPLICATION

This application is based on and claims priority to U.S. Provisional Patent Application No. 63/219,234, filed on Jul. 7, 2021, the disclosure of which is incorporated by reference herein in its entirety.

FIELD

Embodiments of the present disclosure relate to an extension to a Network Based Media Processing (NBMP) segment-based splitter and merger function reference templates. The extension provides added features to the segment-based splitter and merger functions such as supporting a common header, and use of start code and sequence numbering of metadata.

BACKGROUND

A network and cloud platform may be used to run various applications. The NBMP standard defines a set of tools for the independent processing of media segments with equal duration. The NBMP AMD1 defines the splitter and merger function template. The segment-based splitter and merger functions are used for dividing media data into parallel sub-streams where each stream can be processed independently and then the processed streams merged together to create the processing result of the original stream.

The NBMP splitter and merger functions can perform parallel processing of media streams that have clear boundaries. However, these NBMP functions fails to address for common headers in the media streams or their sub-streams. Therefore, the NBMP splitter and merger functions cannot process media streams that have a header at their beginnings. Further, the NBMP standard design only supports timing metadata for finding segment boundaries and does not work with streams that have start codes.

Aspects of the present disclosure address these issues and describe segment-based split and merge functions for parallel processing of media that support common headers and sequence numbering of metadata.

SUMMARY

One or more example embodiments of the present disclosure provide a method and an apparatus for segment-based split and merge functions for parallel processing of media on cloud platform.

According to embodiments, there is provided a method for processing a media stream including segments with common headers via a network based media processing (NBMP) function, performed by at least one processor. The method may include obtaining an input stream including segments, wherein the input stream comprises a first common header in the segments, identifying a start code in the segments, wherein the start code is present at a beginning of a segment and the start code is a unique code that indicates a start of the segment, identifying a sequence number in each of a plurality of segments, wherein the sequence number indicates a location of each segment in the plurality of segments, splitting the input stream into sub-streams using a NBMP splitter function and signaling a location of a respective common header in each of the sub-streams, based on the start code and the sequence number, merging the sub-streams using a NBMP merger function and signaling a location of a second common header, based on the start code and the sequence number, and generating an output stream based on the merged sub-streams, wherein the output stream comprises the second common header.

According to embodiments, there is provided an apparatus for processing a media stream including segments with common headers via a network based media processing (NBMP) function. The apparatus may include at least one memory storing computer program code (instructions) and at least one processor configured to read the program code and operate as instructed by the program code. The program code may include obtaining code configured to cause the at least one processor to obtain an input stream including segments, wherein the input stream comprises a first common header in the segments, first identifying code configured to cause the at least one processor to identify a start code in the segments, wherein the start code is present at a beginning of a segment and the start code is a unique code a start of the segment, second identifying code configured to cause the at least one processor to identify a sequence number in each of a plurality of segments, wherein the sequence number indicates a location of each segment in the plurality of segments, splitting code configured to cause the at least one processor to split the input stream into sub-streams using a NBMP splitter function and signal a location of a respective common header in each of the sub-streams, based on the start code and the sequence number, merging code configured to cause the at least one processor to merge the sub-streams using a NBMP merger function and signal a location of a second common header, based on the start code and the sequence number, and generating code configured to cause the at least one processor to generate an output stream based on the merged sub-streams, wherein the output stream comprises the second common header.

According to one or more embodiments, a non-transitory computer-readable medium storing computer code may be provided. The computer code may be configured to, when executed by at least one processor, cause the at least one processor to obtain an input stream including segments, wherein the input stream comprises a first common header in the segments, identify a start code in the segments, wherein the start code is present at a beginning of a segment and the start code is a unique code that indicates a start of the segment, identify a sequence number in each of a plurality of segments, wherein the sequence number indicates a location of each segment in the plurality of segments, split the input stream into sub-streams using a NBMP splitter function and signal a location of a respective common header in each of the sub-streams, based on the start code and the sequence number, merge the sub-streams using a NBMP merger function and signal a location of a second common header, based on the start code and the sequence number, and generate an output stream based on the merged sub-streams, wherein the output stream comprises the second common header.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

The present disclosure relates to a method and an apparatus for parallel processing of split and merge functions of segments in a media stream.

Embodiments of the present disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

The proposed features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or implemented in the form of software, or implemented in different networks and/or processor apparatuses and/or microcontroller apparatuses. In one example, the one or more processors execute computer program code that is stored in one or more non-transitory computer-readable media.

Figure 1:
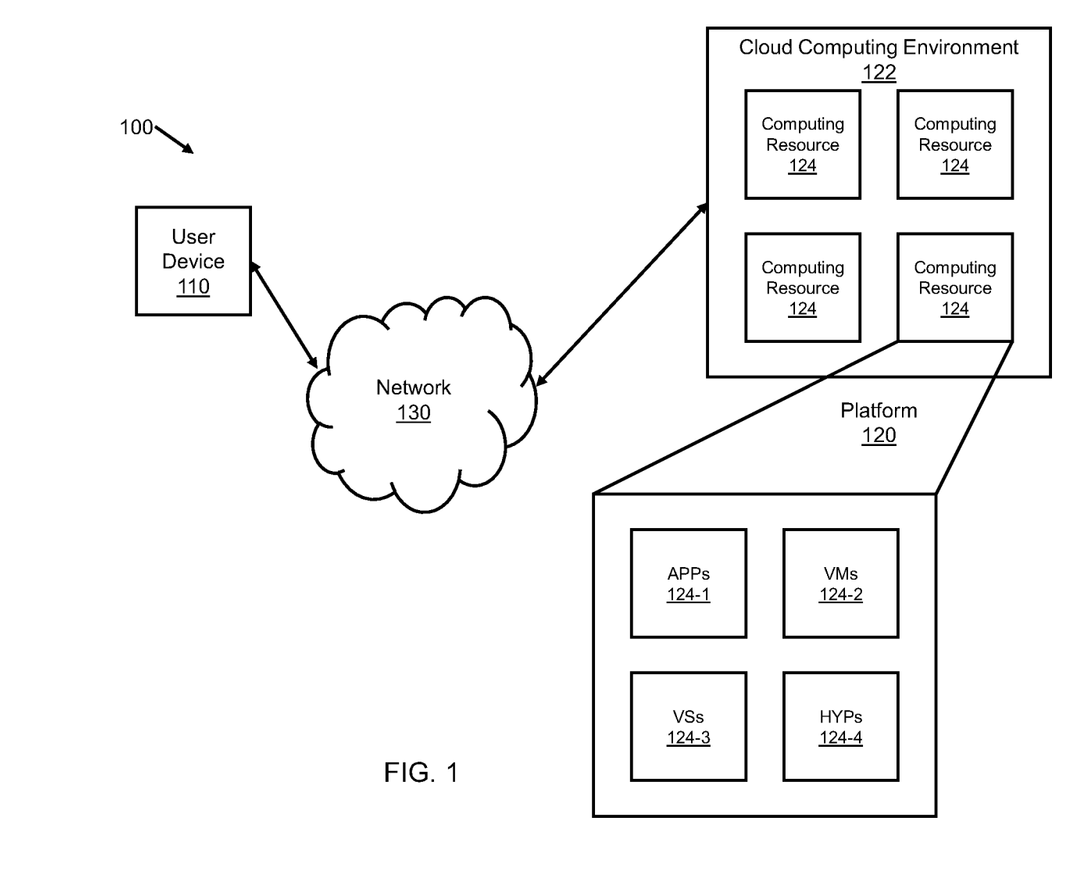
FIG. 1 is a schematic illustration of a communication system, according to one or more embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 may include one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 may include one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 may include an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 may include one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 may include a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 may include one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 may include a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 may include one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
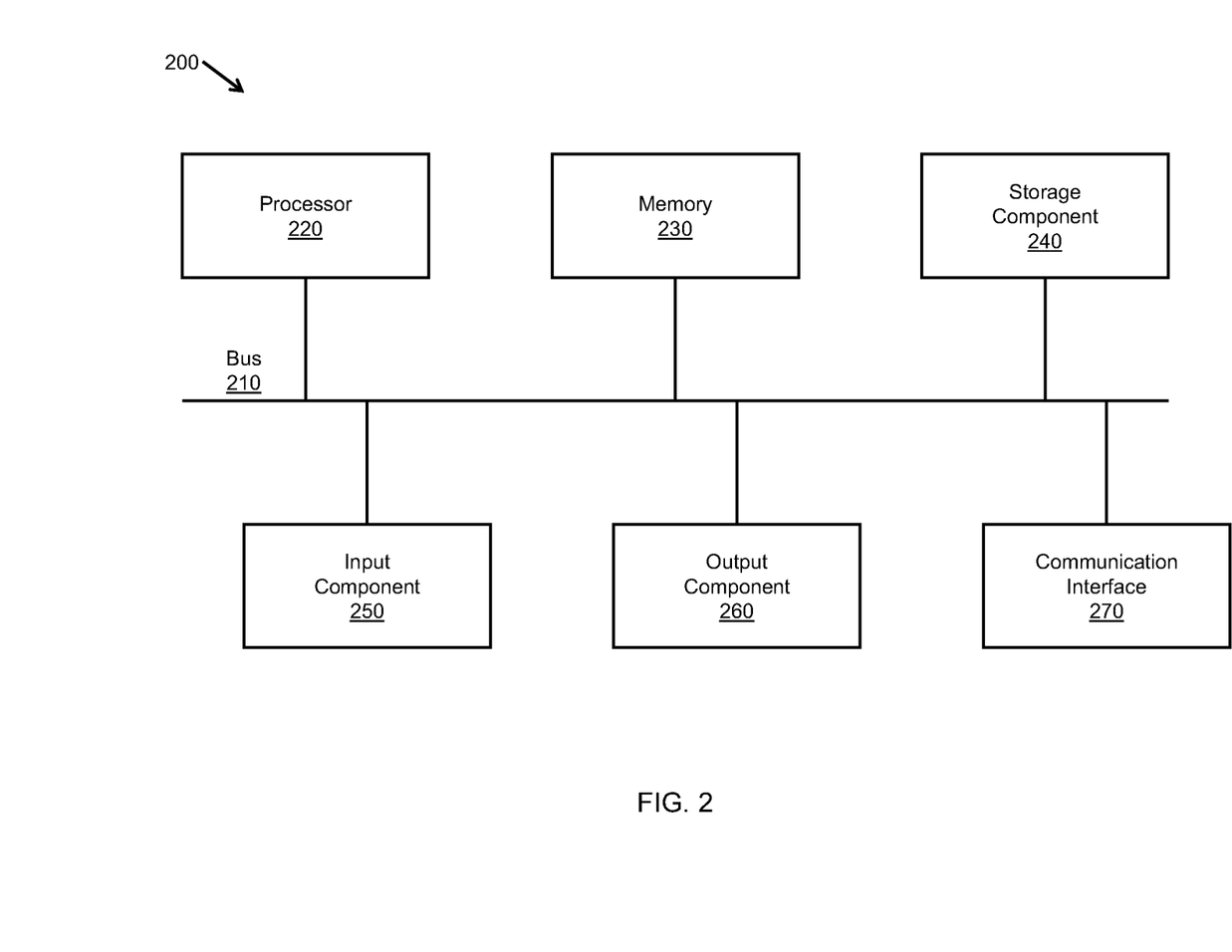
FIG. 2 is a simplified example illustration of a streaming environment, according to one or more embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 may include a component that permits communication among the components of the device 200.

The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 may include one or more processors capable of being programmed to perform a function. The memory 230 may include a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 may store the information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 may include a component that provides output information from the device 200 (e.g. a display, a speaker, and/or one or more light-emitting diodes (LEDs)).

The communication interface 270 may include a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
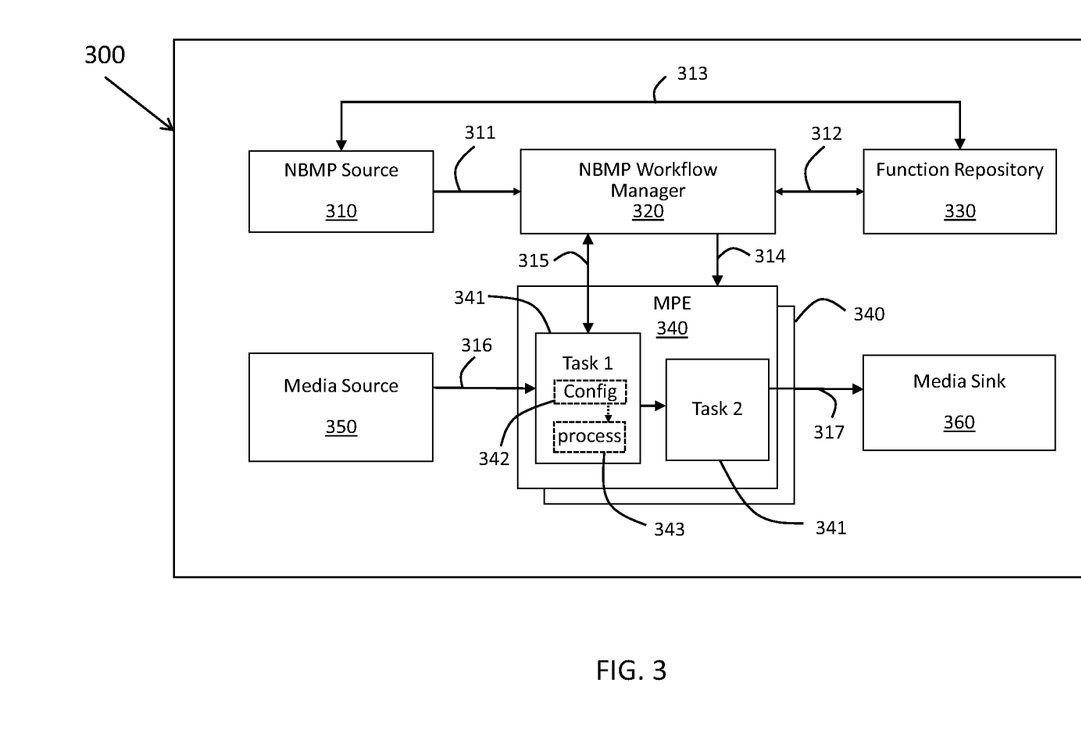
FIG. 3 is a block diagram of an NBMP system, according to one or more embodiments.

In embodiments of the present disclosure, a Network-Based Media Processing (NBMP) system is provided. FIG. 3 illustrates a NBMP system architecture according to embodiments herein and may be implemented with respect to cloud processing. The NBMP system 300 comprises an NBMP source 310, an NBMP workflow manager 320, a function repository 330, one or more media processing entities (MPE) 340, a media source 350, and a media sink 360. The NBMP source 310, NBMP workflow manager 320, function repository 330, MPE 340, media source 350, and media sink 360 may include or be implemented by at least one or more processors and memory that store code configured to cause the at least one or more processors to perform the functions of the NBMP source 310, NBMP workflow manager 320, function repository 330, MPE 340, media source 360, and media sink 360, respectively.

The NBMP source 310 may communicate work flow descriptions with the NBMP workflow manager 320 via a NBMP workflow API 311. The NBMP source 310 may also communicate function descriptions with the function repository 330 via a function discovery API 313. For example, the NBMP source 310 may send workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP workflow manager 320 may communicate with the function repository 330 via a function discovery API 312, which may be a same or different API from the function discovery API 313, and may communicate with one or more of the MPE 340 via an API 314 (e.g. an MPE API).

The media processing entities 340 may include one or more tasks 341. The NBMP workflow manager 320 may also communicate with the tasks 341 via API 315 (e.g. an NBMP Task API). The NBMP workflow manager 320 may use the API 315 to setup, configure, manage, and monitor one or more tasks 341 of a workflow that is performable by the one or more MPE 340. In order to configure, manage, and monitor tasks 341 of the workflow, the NBMP workflow manager 320 may send messages, such as requests, to one or more of the MPE 340 and/or the tasks 341, wherein each message may have several descriptors, each of which have several parameters. Additionally, the communications between the NBMP source 310, the NBMP workflow manager 320, the function repository 330, and the MPE 340 may be considered a control flow.

The tasks 341 may each include media processing functions 343 and configurations 342 for the media processing functions 343. Each of the tasks 341 in a respective media processing entity 340 may also communicate with each other facilitating data flow between tasks. In an embodiment, the NBMP workflow manager 320 may select the tasks based on the descriptions of the tasks in the WDD to search the function repository 330, via the function discovery API 312, to find the appropriate functions to run as tasks 341 for a current workflow. The one or more MPE 340 may be configured to receive media content from the media source 350, process the media content in accordance with the workflow, that includes tasks 341, created by the NBMP workflow manager 320, and output the processed media content to the media sink 360. In an embodiment, the one or more MPE 340 may be provided in parallel for multiple media flows 316 and 317 between the media source 350 and the media sink 360, respectively The media source 350 may include memory that stores media and may be integrated with or separate from the NBMP source 310. In an embodiment, the NBMP workflow manager 320 may notify the NBMP source 310 when a workflow is prepared and the media source 350 may transmit media content to the one or more MPE 340 based on the notification that the workflow is prepared and the one or more MPE 340 may transmit the media content to the media sink 360. The communications between the media source 350, the MPE 340, and the media sink 360 may be considered a data flow.

Figure 4:
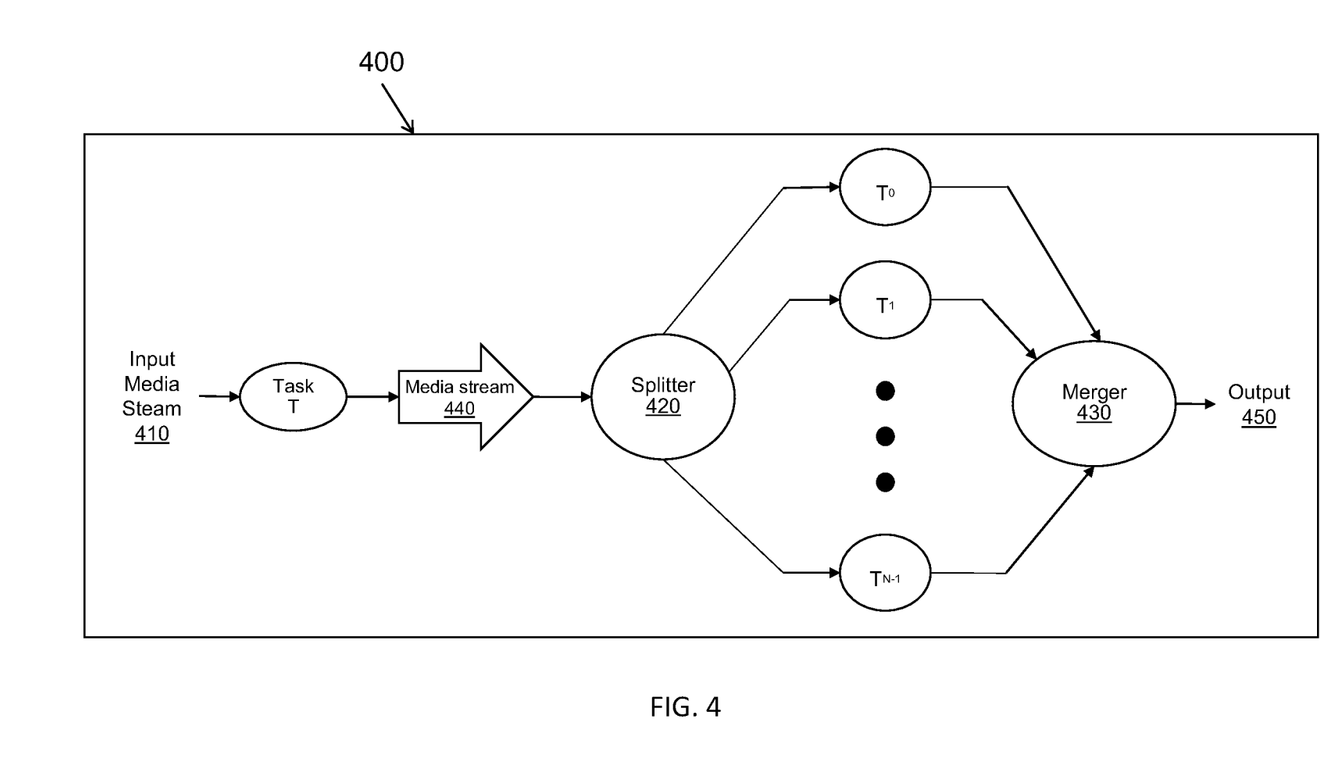
FIG. 4 is an example diagram of an NBMP splitter and merger process according to one or more embodiments.

FIG. 4 shows an example of NBMP splitting and merging segments of a media stream for parallel processing. As shown in FIG. 4, the NBMP splitter and merger process 400 comprises a splitter 420 and a merger 430. In FIG. 4, Task T is converted to n instances of Task T with the n instances running in parallel. The input media stream 410 input to task T may be continuous. The splitter 420 converts the media stream to N media sub-streams. Each sub-stream is processed by an instance of T. The merger 430 then interleaves the sub-streams together to generate an output 450. The output 450 is the equivalent of the output stream of the Task T (i.e., media stream 440).

The 1:N splitter 420 and N:1 merger 430 functions, as shown in FIG. 4, work on the segment boundaries. Each segment has a start, duration, and length metadata associated with it. Since the segments are independent, consequently the sub-streams are independent of each other in terms of being processed by the Task T. In embodiments, Task $T_0, \ldots, T_{N-1}$, are instances of the task T and may process the segments at the same time or separately. Since the segments and sub-streams are independent, each instance of Task T (i.e., $T_0, \ldots, T_{N-1}$) may run at its own speed.

According to embodiments, two concepts may be added to the functions of the splitter 420 and merger 430 to split the stream into sub-streams with common headers and merge the sub-streams, and detect segment boundaries using a start code and sequence number.

[Processing Common Header]

In some embodiments, the media stream input to the splitter 420 may have a common header in the stream before the segments. For example, VPS/SPS headers in video elementary streams or a segment initialization/CMAF master header in DASH/CMAF.

In some embodiments, the N output sub-streams from the splitter 420 may be a conforming stream. Therefore, the common header may be replicated in all the N output sub-streams. While the merger 430 may receive headers in each of its N inputs, the output 450 must only have one header and the repeating of input headers must be avoided. As such, there is a need for the NBMP splitter and the merger functions to be able to properly support handling the common header.

According to embodiments, information on the common header may be provided as input metadata to the splitter 420 and merger 430. Any stream input to the splitter 420 (e.g., the input media stream 410 and/or media stream 440) may have at most one single common header. Further, all the streams input to the merger 430 (e.g., N streams output after the segments are processed by the Task $T_0, \ldots, T_{N-1}$) must have at most one common header which is identical among them. The common header's location may be provided by time metadata and/or start code and sequence number. When the common header's location is provided by time metadata, start, duration, and length constraints of the common header are defined. For example, if the duration constraint of a media segment is 0, all other media segments of the media stream must have non-zero duration. When the common header's location is provided by a start code and sequence number, the common header of the media segment will have the same start code as the other media segments. However, if the sequence number of the media segment is 0, all the other media segments of the media stream must have a non-zero sequence numbers.

An example of processing of the common header when the common header's location is provided by time metadata is described below with reference to FIG. 5. The processing may be performed by the NBMP workflow manager 320.

Figure 5:
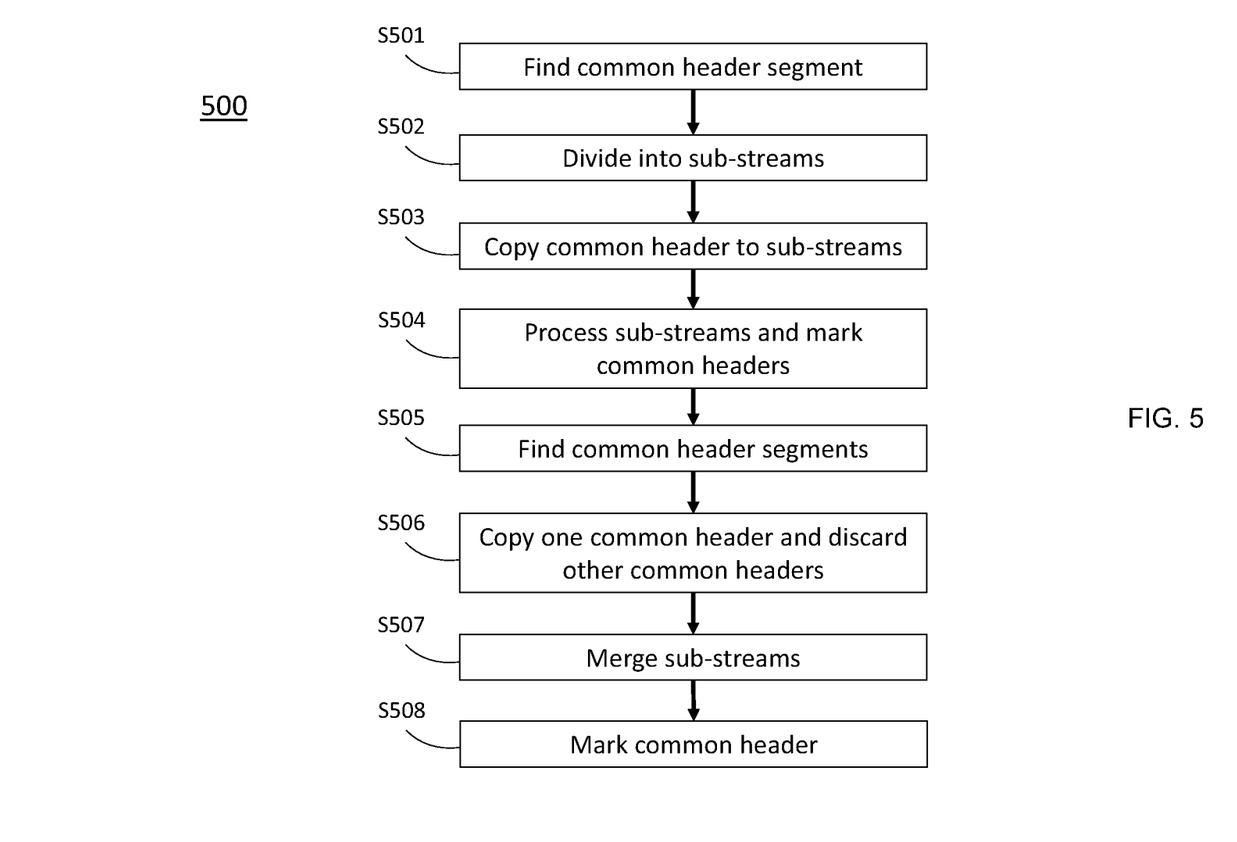
FIG. 5 is a flowchart of an example process for processing an input media stream containing common headers by using time metadata.

FIG. 5 is a flowchart of an example process 500 for processing an input media stream containing a common header by using time metadata.

As shown in FIG. 5, at S501, the splitter 420 finds the common header segment in the media stream. The process 500 then continues with media segment metadata and divides the media stream as described in embodiments of FIG. 4. That is, the media stream is divided into N sub-streams (S502). At S503, the splitter 420 copies the common header to the each of the N sub-streams. At S504, the N sub-streams are then processed by, for example, instances of Task $T_0, \ldots, T_{N-1}$ and the common header at each output metadata (i.e., the processed N sub-streams) is marked. The process 500 then proceeds to the merger 430.

At S505, the merger 430 finds all the common header segments among the N sub-streams input to the merger 430, which were copied to the N sub-streams at S503. At S506, the merger 430 copies only one of the common headers from one of the N sub-stream segments and discards the other common headers from the other sub-streams. The merger 430 then merges the N sub-streams together (S507), as described in embodiments of FIG. 4. At S508, the merger 430 marks the common header in the merged output metadata from S507.

The common header may also be processed when it's location is provided by a start code and sequence number. The NBMP AMD1 uses the following information (i.e., SDLT as described below) in its metadata inputs of the splitter and merger functions to perform this processing.

S: start of the segment in T scale.
D: duration of the segment in T scale.
L: Length of the segment in bytes.
T: time-scale (number of ticks in second).

Embodiments of the present disclosure provide an alternative approach. That is, in the input streams, each segment starts with a unique code that is not repeated anywhere else in the segment or any of the other segments. The unique code may only be at the beginning of each segment. Therefore, the start code may be a signature that indicates the start of a new segment.

If the input segments have an identical starting pattern, then it is not necessary to have the start time and duration of each segment. However, regarding the merger 430, the segments must be merged in the right order. Therefore, a sequence number metadata may be added to the inputs of the merger 430. In embodiments, the sequence number metadata that shows the order of each segment may also be added to the input of the splitter 420 to maintain uniformity. The media segment sequence number is a nonzero number that is monotonically increasing with time.

According to embodiments, the following extension may be provided to the splitter functions of the NBMP workflow manager 320. Specifically, the extension may be provided to the splitter 420.

urn:mpeg:mpegi:nbmp:2020:split

In embodiments, assuming that the input media stream is continuous without any gaps, the splitter 420 (including the above extension) may follow a set of function requirements. The set of function requirements of the splitter 420 is described below.

The splitter 420 may include one input buffer and N output buffers, where N is a configuration parameter for the number of splits. The input and output buffers may be, for example, first in, first out (FIFO) buffers.

The splitter 420 operates one input segment at a time and generates N output segments. The input segment has a continuous set of samples and a maximum duration of D in the scale of time-scale T, where both D and T are configuration parameters. The input segment may include timing metadata or sequence metadata. The timing metadata includes time-scale t=T, start time s in time-scale t, duration d in time-scale t, and length l (bytes) as metadata and function constraints. The sequence metadata includes an identical and unique start code with all other input segments and a sequence number, in increasing continuous order. The input segment has no overlapping samples with other input segments.

A set of input segments to the splitter 420 cover the entire duration of the input. That is, no samples of the input is left out from the total duration. The splitter 420 operates on the input segment in incrementing order. That is, an input segment covering an earlier duration of time shall be processed before any input segments covering a later duration.

The media streams output at every output buffer at any time may include zero or more output segments. The output segments may include a continuous duration of samples with a maximum duration of D in the scale of time-scale t. The output segments may also include timing metadata or sequence metadata. The timing metadata includes time-scale t=T, start time s in time-scale t, duration d in time-scale t, and length l (bytes) as metadata and function constraints. The sequence metadata includes an identical and unique start code with all of the other N output segment and sequence numbers in increasing continuous order. The collection of all output segments, from the N output buffer of the splitter 420, together cover the entire duration of the input media stream (i.e., no sample of input is left out of the collection of output segments).

The splitter 420 operates on an input segment and divides it into N output segments. Each of the N output buffers may receives one of the N output segments. The input segment may be divided into the N output segment with the following order of $s_0, s_1, \ldots, s_{N-1}$, where the segment $s_i$ covers the duration of media right after segment $s_{i-1}$ and $s_{i+1}$. The output buffers may be ordered as $O_0, O_1, \ldots, O_{N-1}$. Accordingly, the output segment $s_i$ may be placed in buffer $O_i$, and so on.

In embodiments, when there is a common header, the splitter 420 may repeat the common header in every output. For example, if the input media stream 410 (and similarly media stream 440) has a common header, the splitter 420 will repeat the common header in every sub-stream. Further, the first segment may be the common header segment and the duration of the first segment may be zero.

Table 1 shows an example of a splitter function description template according to embodiments. As shown in Table 1, the splitter function description template includes descriptors, parameters, parameter types, and their respective descriptions.

TABLE 1

| Descriptor | Parameter Name | Type | Description |
|---|---|---|---|
| | Splitter Function Description Template | | |
| General | nbmp-brand | String | "urn:mpeg:mpegi:nbmp:2020:split" |
| | input-ports | Object | input streams according to configuration |
| | output-ports | Object | output streams according to configuration |
| Processing | Keywords | Array | [<br>"1 to n split",<br>"stateless",<br>"parallelism"<br>] |
| Configuration | Parameters | Array | Function parameters:<br>number of splits<br>time-scale<br>variable-duration<br>segment-duration<br>segment-metadata<br>segment-startcode<br>input-buffer size<br>ouput-buffer sizes<br>repeat-header<br>maximum segment size<br>non-segment-operation<br>percentage increment fullness event |
| Variables | percent-full-buffer | Array of object | Parameter:<br>buffer-fullness |
| Events | percent-full-buffer | Array of object | Parameter:<br>buffer-fullness |
| Step | step-mode | string | Value: 'stateless' |
| | segment-duration | number | Value of D as defined in Description subclause. |
| | operation-units | number | Value of 1 |
| | segment-metadata | boolean | The value of segment-metadata or |
| | segment-startcode | boolean | segment-startcode values shall be set to 'TRUE'. |

Table 2 shows example splitter configuration parameters according to embodiments. As shown in Table 2, the splitter configuration parameters may include unit, type, and valid range. The definition of the splitter configuration parameters are also shown in Table 2. The splitter configuration parameters of Table 1 may be provided in the splitter 420.

TABLE 2

| Name | Definition | Unit | Type | Valid range |
|---|---|---|---|---|
| | Splitter Configuration Parameters | | | |
| split-number | Number of splits | N/A | number | unsigned integer (non-zero) |
| time-scale | The timescale in units per second to be used for the derivation of different real-time duration values of media segments.<br>If not present on any level, it shall be set to 1. | N/A | number | unsigned integer |
| variable-duration | If 'True', the segment duration may vary segment to segment.<br>If 'False', every segment has a duration equal to segment-duration. | N/A | N/A | boolean |
| segment-duration | The duration of the operational segment in scale of time-scale<br>If variable-duration is 'True', this value indicates the maximum duration of the segment. | N/A | number | unsigned integer |
| segment-metadata | If 'TRUE', this function supports receiving and providing segment metadata (as input/output metadata) for each media input/output to detect the segment boundaries.<br>The default value is 'FALSE' | N/A | boolean | N/A |

TABLE 2-continued

Splitter Configuration Parameters

| Name | Definition | Unit | Type | Valid range |
|---|---|---|---|---|
| segment-startcode | If 'TRUE', this function supports receiving and providing a start code (as input/output metadata) for each media input/output to detect the segment boundaries. The default value is 'FALSE" | N/A | boolean | N/A |
| in-buffer-size | Size of the input FIFO buffer | byte | number | unsigned integer |
| out-buffer-size | Size of each output FIFO buffer | byte | number | unsigned integer |
| max-segment-size | Maximum size of operational segment | byte | number | unsigned integer |
| repeat-header | If 'true', the common header of the input is repeated at each output. The default is 'false'. | N/A | Boolean | Boolean |
| non-segment-op | If 'true', this implementation supports non-segment operation. The default is 'false'. | N/A | Boolean | Boolean |
| buffer-fullness-inc-event | The percentage increase of buffer fullness by which an event is issued | N/A | number | unsigned integer between 1 and 100 | unsigned integer = [0, (2 * 53) − 1]

Table 3 shows a splitter variable parameter (e.g., a management interface FIFO (MIFIFO) buffer parameter) according to embodiments, including the unit, type, and valid range of the parameter.

TABLE 3

Splitter Variable Parameter

| Name | Definition | Unit | Type | Valid range |
|---|---|---|---|---|
| buffer-fullness | The level buffer fullness | percentage | number | unsigned integer | unsigned integer = [0, (2 * 53) − 1]

According to embodiments, the following extension may be provided to the merger functions of the NBMP workflow manager 320. Specifically, the extension may be provided to the merger 430.

urn:mpeg:mpegi:nbmp:2020:merge

In embodiments, assuming that the input media stream is continuous without any gaps, the merger 430 (including the above extension) may follow a set of function requirements. The set of function requirements of the merger 430 is described below.

The merger 430 includes N input buffers and one output buffer, where N is a configuration parameter for the number of splits. The output buffer may be, for example, first in, first out (FIFO) buffers.

The merger 430 operates one input segment for each input buffer, totaling N segments, at a time and generates one output segment. Each of the input segments may have a continuous set of samples and a maximum duration of D in the scale of time-scale T, where both D and T are configuration parameters. Each of the input segments may also include timing metadata or sequence metadata. The timing metadata includes time-scale t=T, start time s in time-scale t, duration d in time-scale t, and length l (bytes). The sequence metadata includes an identical and unique start code with all of the input segments and a sequence number in increasing order. The input segments have no overlapping samples with other input segments.

A set of input segments of N buffers, input to the merger 430, cover the entire duration of the input. That is, no sample of the input is left out from the total duration. The merger 430 operates on the input segments in incrementing order. That is, a segment covering an earlier duration of time is processed before any segment covering a later duration.

The media streams at the output buffer at any time may include zero or more output segments. Each output segment may include a continuous duration of samples with a maximum duration of N*D in the scale of time-scale t. The output segments may also include timing metadata or sequence metadata. The timing metadata includes time-scale t=T, start time s in time-scale t, duration d in time-scale t, and length l (bytes). The sequence metadata includes an identical and unique start code with all of the N output segment and sequence numbers in increasing order. The collection of output segments of all the output buffers in a media stream together cover the entire duration of the input media stream (i.e., no sample of input is left out of the collection of output segments).

The merger 430 operates on every input segment from each input buffer and merges the input segments into one output segment. One segment from each input buffer may be processed, $s_0, s_1, \ldots, s_{N-1}$, from input buffers $I_0, I_1, \ldots, I_{N-1}$, respectively. The segment $s_i$ may include samples of time interval exactly between the time intervals of $s_{i-1}$ and $s_{i+1}$. The segments $s_0, s_1, \ldots, s_{N-1}$ may be concatenated, in increasing order, into one output segment. That is, $s_0$ may be concatenated with $s_1$, then with $s_2$, and so on until $s_{N-1}$. The segments $s_0, s_1, \ldots, s_{N-1}$ may be concatenated such that the output segment includes all samples of segments $s_0, s_1, \ldots, s_{N-1}$ with no repeating samples and with the earliest presentation of EPT or their sequence numbers are increasing.

In embodiments, when there is a common header at each input to the merger 430, the merger 430 may repeat the common header once at its output. For example, if N processed sub-streams each have a common header, the merger 430 may only have one instance of the common header in the output 450. In one or more embodiments, the first segment of the output 450 may be the common header and the duration of the first segment may be zero. As such, the merger 430 may keep only one common header and discard the common headers of the other input segments present in the sub-streams produced by the splitter 420.

Table 4 shows an example of a merger function description template according to embodiments. As shown in Table 4, the merger function description template includes descriptors, parameters, parameter types, and their respective descriptions.

TABLE 4

Merger Function Description Template

| Descriptor | Parameter Name | Type | Description |
| --- | --- | --- | --- |
| General | nbmp-brand | String | "urn:mpeg:mpegi:nbmp:2020:merge" |
|  | input-ports | Object | input streams according to configuration |
|  | output-ports | Object | output streams according to configuration |
| Processing | Keywords | Array | [ <br> "n to 1 merge", <br> "stateless", <br> "parallelism" <br> ] |
| Configuration | Parameters | Array | Function parameters: <br> variable-duration <br> segment-duration <br> segment-metadata <br> segment-startcode <br> number of merges <br> input buffer sizes <br> output buffer sizes <br> maximum segment size <br> repeat-header <br> non-segment-operation <br> percentage increment fullness event |
| Variables | percent-full-buffer | Array of object | Parameter: <br> buffer-fullness |
| Events | percent-full-buffer | Array of object | Parameter: <br> buffer-fullness |
| Step | step-mode | string | Value: 'stateless' |
|  | segment-duration | number | Value of D as defined in Description subclause. |
|  | operation-units | number | Value of 1 |
|  | segment-metadata | boolean | The value of segment-metadata or |
|  | segment-startcode | boolean | segment-startcode values shall be set to 'TRUE'. |

Table 5 shows merger configuration parameters according to embodiments. As shown in Table 5, the merger configuration parameters may include unit, type, and valid range. The definition of the merger configuration parameters are also shown in Table 5. The merger configuration parameters of Table 5 may be provided in the merger 430.

TABLE 5

Merger Configuration Parameters

| Name | Definition | Unit | Type | Valid range |
| --- | --- | --- | --- | --- |
| merge-number | Number of merges | N/A | number | unsigned integer (non-zero) |
| time-scale | The timescale in units per second to be used for the derivation of different real-time duration values of media segments. If not present on any level, it shall be set to 1. | N/A | number | unsigned integer |
| variable-duration | If 'True', the segment duration may vary segment to segment. If 'False', every segment has a duration equal to segment-duration. | N/A | N/A | boolean |
| segment-duration | The duration of the operational segment in scale of time-scale If variable-duration is 'True', this value indicates the maximum duration of the segment. | N/A | number | unsigned integer |

TABLE 5-continued

Merger Configuration Parameters

| Name | Definition | Unit | Type | Valid range |
| --- | --- | --- | --- | --- |
| segment-metadata | If 'TRUE', this function supports receiving and providing segment metadata (as input/output metadata) for each media input/output to detect the segment boundaries. The default value is 'FALSE" | N/A | boolean | N/A |
| segment-startcode | If 'TRUE', this function supports receiving and providing a start code (as input/output metadata) for each media input/output to detect the segment boundaries. The default value is 'FALSE" | N/A | boolean | N/A |
| in-buffer-size | Size of each input FIFO buffers. | byte | number | unsigned integer |
| out-buffer-size | Size of the output FIFO buffer. | byte | number | unsigned integer |
| max-segment-size | Maximum size of operational segment | byte | number | unsigned integer |
| repeat-header | If 'true', the common header of the inputs is added to the output only once. The default is 'false'. | N/A | Boolean | Boolean |
| non-segment-op | If 'true', this implementation supports non-segment operation The default is 'false'. | N/A | boolean | Boolean |
| buffer-fullness-inc-event | The percentage increase of buffer fullness by which an event is issued | N/A | number | unsigned integer between 1 and 100 | unsigned integer = [0, (2 * 53) − 1]

Table 6 shows a merger variable parameter (e.g., a management interface FIFO (MIFIFO) buffer parameter) according to embodiments, including the unit, type, and valid range of the parameter.

TABLE 6

Merger Variable Parameter

| Name | Definition | Unit | Type | Valid range |
| --- | --- | --- | --- | --- |
| buffer-fullness | The level buffer fullness | percentage | number | unsigned integer | unsigned integer = [0, (2 * 53) − 1]

Figure 6:
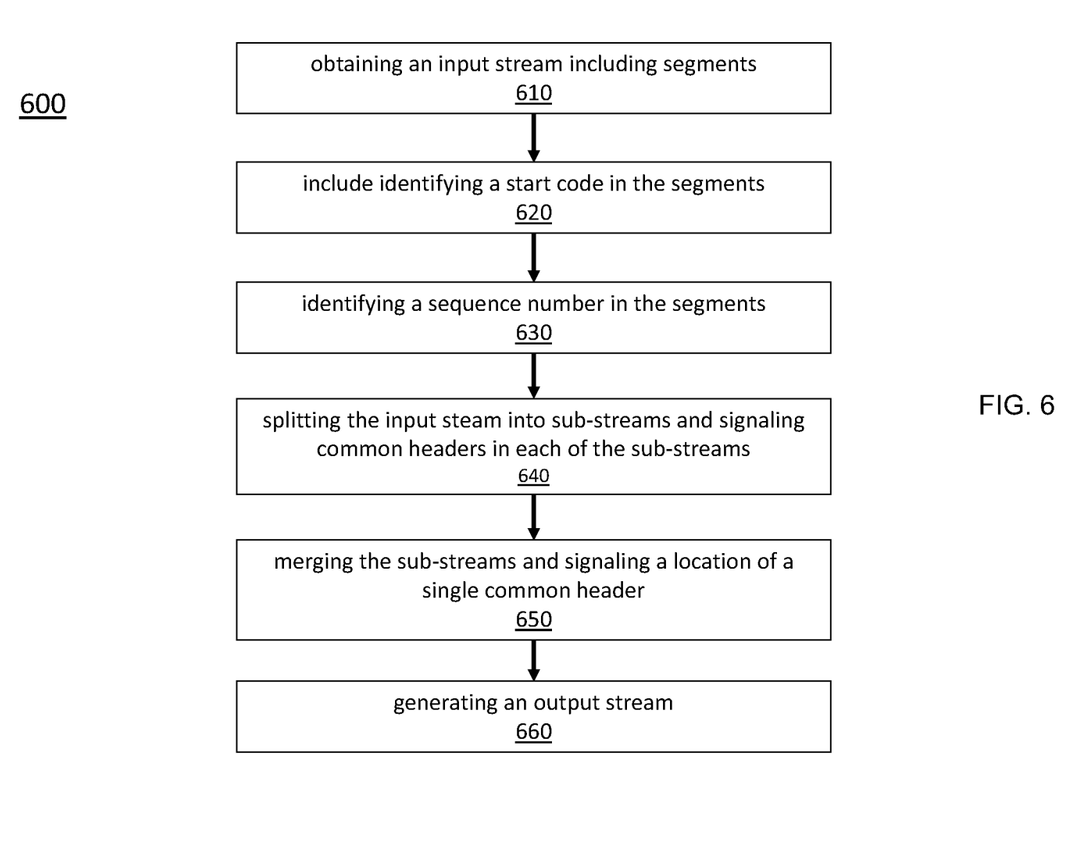
FIG. 6 is a block diagram of an example process for processing a media stream including segments with common headers, according to one or more embodiments.

FIG. 6 is a flowchart of an example method 600 for identifying segment boundaries in segments with a unique start code, according to one or more embodiments.

In some implementations, one or more process blocks of FIG. 6 may be performed by the platform 120. In some implementations, one or more process blocks of FIG. 6 may be performed by another device or a group of devices separate from or including the platform 120, such as the user device 110.

As shown in FIG. 6, in operation 610, the method 600 may include obtaining an input stream including segments, wherein the input stream comprises a first common header in the segments.

In operation 620, the method 600 may include identifying a start code in the segments. The start code may be present at the beginning of a segment. The start code is a unique code that indicates a start of the segment.

In operation 630, the method 600 may include identifying a sequence number in each of a plurality of segments. The sequence number indicates a location of each segment in the plurality of segments. That is, the sequence number may be used to determine the order in which sub-streams of the input stream are processed.

In operation 640, the method 600 may include splitting the input stream into sub-streams using the splitter 420 or a NBMP splitter function and signaling a location of a respective common header in each of the sub-streams, based on the start code and the sequence number.

In operation 650, the method 600 may include merging the sub-streams using the merger 430 or a NBMP merger function and signaling a location of a second common header, based on the start code and the sequence number.

In operation 650, the method 600 may include generating an output stream with the common header produced once in a first segment of the output stream.

Although FIG. 6 shows example blocks of the method, in some implementations, the method may include additional blocks, fewer blocks, different blocks, or differently arranged blocks than those depicted in FIG. 6. Additionally, or alternatively, two or more of the blocks of the method may be performed in parallel. The method may be performed in the NBMP system 300 but is not limited to this.

Figure 7:
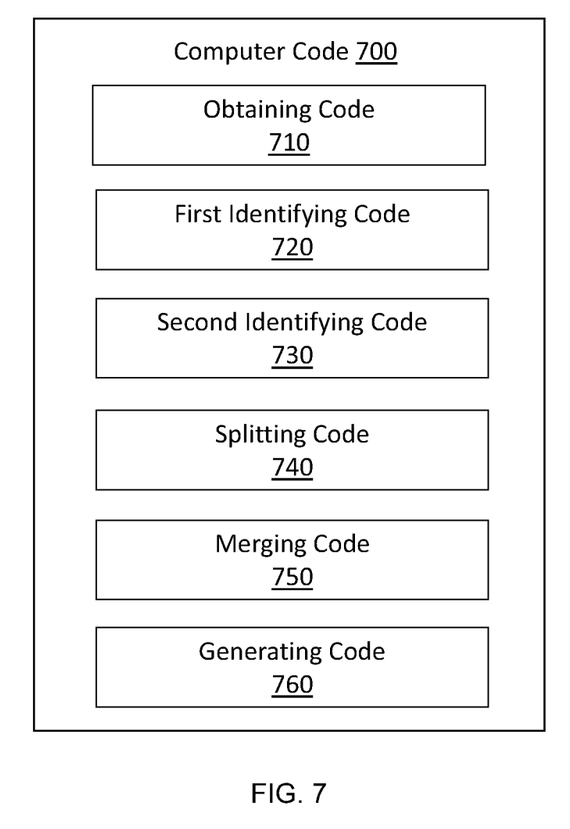
FIG. 7 is a block diagram of an example of computer code for processing a media stream including segments with common headers, according to one or more embodiments.

FIG. 7 is a block diagram of an example of computer code for identifying segment boundaries in segments with a unique start code, according to one or more embodiments.

According to embodiments of the present disclosure, at least one processor with memory storing computer code may be provided. The computer code may be configured to, when executed by the at least one processor, perform any number of aspects of the present disclosure.

For example, with reference to FIG. 7, computer code 700 may be implemented in the NBMP system 300 but is not limited to this.

As shown in FIG. 7, the computer code 700 may include obtaining code 710, first identifying code 720, second identifying code 730, splitting code 740, merging code 750, and generating code 760.

The obtaining code 710 may be configured to cause the at least one processor to obtaining code configured to cause the at least one processor to obtain an input stream including segments, wherein the input stream comprises a first common header in the segments.

The first identifying code 720 may be configured to cause the at least one processor to identify a start code in the segments. The start code may present at the beginning of a segment and the start code is a unique code that indicates the start of the segment.

The second identifying code 730 may be configured to cause the at least one processor to identify a sequence number in each of a plurality of segments. The sequence number indicates a location of each segment in the plurality of segments and may be used to determine the processing order of the segments.

The splitting code 740 may be configured to cause the at least one processor to split the input stream into sub-streams using the splitter 420 or a NBMP splitter function and signal a location of a respective common header in each of the sub-streams, based on the start code and the sequence number.

The merge code 750 may be configured to cause the at least one processor to merge the sub-streams using the merger 430 or a NBMP merger function and signaling a location of a second common header, based on the start code and the sequence number.

The generating code 760 may be configured to cause the at least one processor to generate an output stream based on the merged sub-streams, wherein the output stream comprises the second common header.

Although FIG. 7 shows example blocks of the computer code 700 of an apparatus or device according to embodiments, in some implementations, the apparatus may include additional blocks, fewer blocks, different blocks, or differently arranged blocks than those depicted in FIG. 7. Additionally, or alternatively, two or more of the blocks of the apparatus may be combined.

The techniques for signaling common headers when processing an input media stream described above may be used separately or combined in any order. Further, each of the methods (or embodiments) may be implemented by processing circuitry (e.g., one or more processors or one or more integrated circuits). In one example, the one or more processors may execute a program that is stored in a non-transitory computer-readable medium.

The present disclosure provides illustration and description, but is not intended to be exhaustive or to limit the implementations to the precise form disclosed. Modifications and variations are possible in light of the present disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for processing a media stream including segments with common headers via a network based media processing (NBMP) function, performed by at least one processor, the method comprising:
   obtaining an input stream including segments, wherein the input stream comprises a first common header in the segments;
   identifying a start code in the segments, wherein the start code is present at a beginning of a segment and the start code is a unique code that indicates a start of the segment;
   identifying a sequence number in each of a plurality of segments, wherein the sequence number indicates a location of each segment in the plurality of segments;
   splitting the input stream into sub-streams using a NBMP splitter function and signaling a location of a respective common header in each of the sub-streams, based on the start code and the sequence number;
   merging the sub-streams using a NBMP merge function and signaling a location of a second common header, based on the start code and the sequence number; and
   generating an output stream based on the merged sub-streams, wherein the output stream comprises the second common header.

2. The method of claim 1, wherein the respective common header in each of the sub-streams are identical.

3. The method of claim 1, further configuring copying the first common header into each of the sub-streams at the location of the respective common header in each of the sub-streams, wherein the location of the respective common header in each of the sub-streams is unique.

4. The method of claim 1, further configuring copying the first common header from one of the sub-streams into the location of the second common header in the output.

5. The method of claim 1, wherein each of the segments included in the input stream corresponds to one of the sub-streams.

6. The method of claim 1, wherein the segments included in the input stream cover an entire duration of the input stream.

7. The method of claim 1, wherein the sub-streams are processed in incrementing order based on the sequence number.

8. The method of claim 1, wherein the second common header is only reproduced once in the output, and a segment of the second common header is a first segment of the output and has a duration of zero.

9. An apparatus for processing a media stream including segments with common headers via a network based media processing (NBMP) function, the apparatus comprising:
- at least one memory configured to store program code; and
- at least one processor configured to read the program code and operate as instructed by the program code, the program code including:
  - obtaining code configured to cause the at least one processor to obtain an input stream including segments, wherein the input stream comprises a first common header in the segments;
  - first identifying code configured to cause the at least one processor to identify a start code in the segments, wherein the start code is present at a beginning of a segment and the start code is a unique code that indicates a start of the segment;
  - second identifying code configured to cause the at least one processor to identify a sequence number in each of a plurality of segments, wherein the sequence number indicates a location of each segment in the plurality of segments;
  - splitting code configured to cause the at least one processor to split the input stream into sub-streams using a NBMP splitter function and signal a location of a respective common header in each of the sub-streams, based on the start code and the sequence number;
  - merging code configured to cause the at least one processor to merge the sub-streams using a NBMP merger function and signal a location of a second common header, based on the start code and the sequence number; and
  - generating code configured to cause the at least one processor to generate an output stream based on the merged sub-streams, wherein the output stream comprises the second common header.

10. The apparatus of claim 9, wherein the respective common header in each of the sub-streams are identical.

11. The apparatus of claim 9, wherein the splitting code is further configured to cause the at least one processor to copy the first common header into each of the sub-streams at the location of the respective common header in each of the sub-streams, wherein the location of the respective common header in each of the sub-streams is unique.

12. The apparatus of claim 9, wherein the merging code is further configured to cause the at least one processor to copy the first common header from one of the sub-streams into the location of the second common header in the output.

13. The apparatus of claim 9, wherein each of the segments included in the input stream corresponds to one of the sub-streams.

14. The apparatus of claim 9, wherein the segments included in the input stream cover an entire duration of the input stream.

15. The apparatus of claim 9, wherein the sub-streams are processed in incrementing order based on the sequence number.

16. The apparatus of claim 9, wherein the second common header is only reproduced once in the output, and a segment of the second common header is a first segment of the output and has a duration of zero.

17. A non-transitory computer readable medium storing instructions, the instructions comprising: one or more instructions that, when executed by at least one processor of an apparatus for processing a media stream including segments with common headers via a network based media processing (NBMP) function, cause the at least one processor to:
- obtain an input stream including segments, wherein the input stream comprises a first common header in the segments;
- identify a start code in the segments, wherein the start code is present at a beginning of a segment and the start code is a unique code that indicates a start of the segment;
- identify a sequence number in each of a plurality of segments, wherein the sequence number indicates a location of each segment in the plurality of segments;
- split the input stream into sub-streams using a NBMP splitter function and signal a location of a respective common header in each of the sub-streams, based on the start code and the sequence number; and
- merge the sub-streams using a NBMP merger function and signal a location of a second common header, based on the start code and the sequence number; and
- generate an output stream based on the merged sub-streams, wherein the output stream comprises the second common header.

18. The non-transitory computer readable medium of claim 17, wherein each of the segments included in the input stream corresponds to one of the sub-streams, the segments included in the input stream cover an entire duration of the input stream, and wherein the sub-streams are processed in incrementing order based on the sequence number.

19. The non-transitory computer readable medium of claim 17, wherein the instructions further cause the at least one processor to copy the common header from one of the sub-streams into the location of the second common header in the output,
- wherein the second common header is only reproduced once in the output, and a segment of the second common header is a first segment of the output and has a duration of zero.

20. The non-transitory computer readable medium of claim 17, wherein the instructions further cause the at least one processor to copy the common header into each of the sub-streams at the location of the common header in each of the sub-streams,
- wherein the location of the common header in each of the sub-streams is unique, and the common header in each of the sub-streams of are identical.

* * * * *